US008803734B2

(12) United States Patent
Wirola et al.

(10) Patent No.: US 8,803,734 B2
(45) Date of Patent: Aug. 12, 2014

(54) PREFERENCE LISTS FOR ASSISTANCE DATA REQUESTS IN GLOBAL NAVIGATION SATELLITE SYSTEMS

(75) Inventors: Lauri Aarne Johannes Wirola, Tampere (FI); Ismo Kullervo Halivaara, Tampere (FI); Tommi Antero Laine, Tampere (FI)

(73) Assignee: Nokia Corporation, Espoo (FI)

( * ) Notice: Subject to any disclaimer, the term of this patent is extended or adjusted under 35 U.S.C. 154(b) by 413 days.

(21) Appl. No.: 12/814,490

(22) Filed: Jun. 14, 2010

(65) Prior Publication Data

US 2011/0140960 A1    Jun. 16, 2011

Related U.S. Application Data

(60) Provisional application No. 61/186,549, filed on Jun. 12, 2009.

(51) Int. Cl.
  *G01S 19/05* (2010.01)
  *G01S 19/25* (2010.01)
  *G01S 19/33* (2010.01)

(52) U.S. Cl.
  USPC ............. 342/357.42; 342/357.64; 342/357.73

(58) Field of Classification Search
  USPC .............. 342/357.41, 357.64, 357.73, 357.42
  See application file for complete search history.

(56) References Cited

U.S. PATENT DOCUMENTS

| | | | |
|---|---|---|---|
| 6,915,210 B2 | 7/2005 | Longhurst et al. | |
| 7,298,321 B2 * | 11/2007 | King et al. | ............... 342/357.43 |
| 2008/0228398 A1 | 9/2008 | Syrjarinne et al. | |
| 2008/0234980 A1 | 9/2008 | Wirola et al. | |
| 2010/0013701 A1 | 1/2010 | Fischer et al. | |

FOREIGN PATENT DOCUMENTS

| | | |
|---|---|---|
| CN | 1829923 A | 9/2006 |
| WO | 2007/099196 A1 | 9/2007 |

OTHER PUBLICATIONS

International Search Report and Written Opinion received from corresponding Patent Cooperation Treaty Application No. PCT/FI2010/050485, Oct. 1, 2010, 13 pages.
Nokia Siemens Networks, et al., "Alternative for E-SMLC Capability Indication", 3GPP TSG-RAN WG2 #67, R2-094681, Shenzhen, China, Aug. 24-28, 2009, 3 pages.
Chinese Office Action for Application No. 201080025817.4, dated Sep. 10, 2013.
Wirola, L., et al.; "*GLONASS Orbits in GPS/Galileo-style Ephemeredes for Assisted GNSS*;" Proceedings of the 2008 National Technical Meeting of The Institute of Navigation; pp. 1032-1039; dated Jan. 2008.
Office Action for Chinese Application No. 201080025817.4; dated Jan. 27, 2014.

* cited by examiner

Primary Examiner — Cassie Galt
(74) Attorney, Agent, or Firm — Alston & Bird LLP

(57) ABSTRACT

Methods and devices may request and provide assistance data from an assistance server to a receiver in a global navigation satellite system. A request for assistance data may include a preference list of navigation models suitable for the requesting receiver. Multiple preference lists for different navigation model types (e.g., orbit model, clock model, almanac model) may be included in a single list and/or data structure, or as multiple lists and/or data structures. An assistance server may receive and process the preference list, for example, by parsing and traversing the ordered list(s) for different navigation model types, in order to provide satellite navigation data to the receiver in accordance with suitable navigation models that are available at both the receiver and the assistance server.

30 Claims, 4 Drawing Sheets

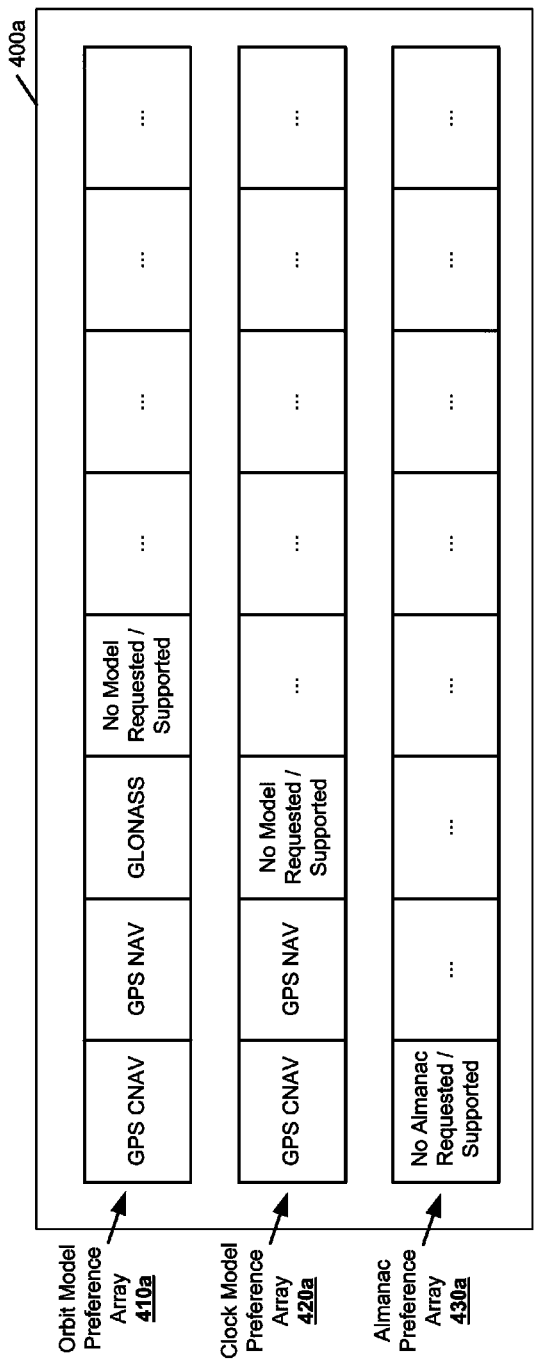
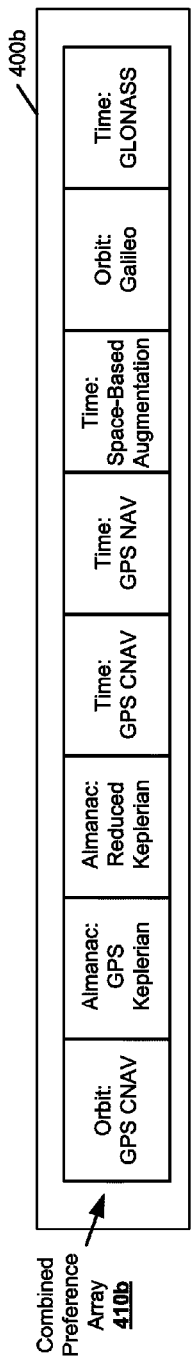
FIG. 4A
FIG. 4B

PREFERENCE LISTS FOR ASSISTANCE DATA REQUESTS IN GLOBAL NAVIGATION SATELLITE SYSTEMS

FIELD OF DISCLOSURE

This invention relates to the field of positioning, in particular preference lists for assistance data requests in global navigation satellite systems.

BACKGROUND

One of the most well known global navigation satellite systems (GNSSs) is the Global Positioning System (GPS). Other GNSSs include, for example, the GLObal NAvigation Satellite System (GLONASS) and the European Galileo positioning system (Galileo). A GNSS may be used in conjunction with a receiver device (e.g., a standalone GNSS navigation device or a GNSS-enabled mobile receiver device) to achieve a plurality of functions. For example, GPS mobile receivers may assist users in determining their exact location, navigating roads and locating a destination, and viewing a map of a surrounding area. While traditional stand-alone navigation devices still exist, technology now allows navigation devices to be a part of other mobile receivers such as cellular phones or personal data assistants (PDAs).

Navigation devices and other mobile receivers may receive assistance data from an assistance server in addition to receiving signals from the various satellites of the various GNSSs. Assistance data may include, for example, data instructing the mobile receiver where to look for GNSS signals (e.g., satellite positions in the sky, Doppler frequency of the satellite signal, etc). Additionally, assistance data provided to the receiver may include a recent ephemeris for a GNSS satellite (e.g., a recent set of orbit, clock, and/or almanac parameters for the satellite). Assistance data may also include corrections made to an ephemeris, or a confirmation of ephemeris data, to allow the receiver to more quickly and accurately determine its position. Thus, assistance data may allow receivers to gain certain advantages, such as detecting GNSS signals quicker than without the assistance data and detecting weaker signals.

GNSS-based positioning requires that the GNSS receiver has knowledge of the satellite navigation models used for the data. A navigation model refers to a format for the parameterization of a type of satellite data, such as orbit model. That is, satellites in one GNSS may transmit orbital parameters according to a first format, while satellites in another GNSS may transmit orbital parameters in a second format. Additional types of satellite data (e.g., clock parameters, almanac parameters) may have additional different sets of possible formats in different GNSSs. In the case of a stand-alone GNSS, a mobile receiver obtains the navigation models as well as almanacs from the satellite broadcasts. However, in an assisted GNSS scheme, the receiver may obtain a copy of the navigation models and almanac from one or more assistance servers via a separate ground-based communication network (e.g., cellular network, IP network).

Assisted GNSS allows for the possibility that GNSS receivers may receive satellite data from assistance servers in non-native formats. To illustrate, a stand-alone receiver in a GLONASS GNSS receives its GNSS data from the satellite in the GLONASS native format (i.e., GLONASS parameterization). However, if the same GLONASS satellite data is provided to the receiver via an assistance server having additional navigation models, then the assistance server may be able to provide the receiver with the data in an alternative format. This may be potentially beneficial, for example, if a non-native navigation model has a longer data validity period than the native format. As an example, Wide-Area Reference Networks follow GNSS satellites and their broadcast signals. Such networks allow for modeling the satellite orbits very accurately and predicting orbits as much as several weeks in advance. Therefore, it is possible to take such a trajectory prediction for an SV in the first navigation system (e.g., GLONASS) and fit the parameters into a navigation model natively used in a second navigation system (e.g., GPS NAV Keplerian parameterization) so that the trajectory described by the parameterization complies with the predicted orbit for the said SV in the first navigation system. In this example, instead of having to obtain an updated navigation model for the GLONASS SV every 30 minutes (the nominal validity period of the GLONASS model), when using native model, the update rate can be dropped to 4 hours (the nominal validity period of the GPS NAV Keplerian model).

However, this scheme of requesting assistance data from assistance servers in a non-native format may be problematic. For example, when the receiver requests assistance data, it does not know which navigation models are supported by the assistance server. Similarly, assistance servers do not know what navigation models can be utilized by the receiver. If an assistance server does not support a requested navigation type, it might simply return an error to the receiver, or it may default by providing the data to the receiver in the native format. These scenarios may be problematic and inefficient, especially in modern systems having more and more GNSSs using more and more navigation models. Furthermore, International GNSS Services (IGSs) and other services may provide navigation models to assistance servers in additional formats that are not native to any GNSS.

Hence, there is a need for additional devices and methods for requesting and providing assistance data from an assistance server to a receiver in a GNSS.

SUMMARY

A receiver in a global navigation satellite system (GNSS) may request assistance data from an assistance server. In certain embodiments, a receiver (e.g., a GNSS mobile receiver) may create a list identifying one or more navigation models (e.g., GNSS native formats) that are suitable to or preferred by the receiver for receiving GNSS assistance data. The receiver may generate and transmit an assistance data request including the list of preferred navigation models to the assistance server, thereby allowing the assistance server to receive and parse the list to determine which GNSS navigation models are supported and/or preferred by the receiver. The assistance server may then provide the requested assistance data to the receiver formatted in accordance with one or more of the preferred navigation models. In certain embodiments, the list of preferred navigation models may be ordered by the receiver according to preference, so that the assistance server may traverse the list in order and may provide the assistance data to the mobile receiver in the most preferred model that is available on the assistance server.

According to one or more additional embodiments, the GNSS receiver may transmit the list of the preferred navigation models separately from the assistance data request. For example, a receiver may create and transmit a navigation model preference list in an earlier transmission to an assistance server, so that the assistance server may receive and store the preference list associated with that receiver. Then, when the receiver sends one or more subsequent assistance data requests, which need not include the list, the assistance server may retrieve and process the previously sent list to determine the appropriate navigation model for the response.

In certain embodiments, the list of preferred navigation models may comprise multiple different sub-lists for different navigation model types, such as, for example, orbit models, clock models, and almanac models. In certain examples, the list may comprise a data structure having different arrays for different types of navigation models. In other examples, the different sub-lists for different navigation model types may be included in a single array or flat list.

In addition, the foregoing embodiments can be implemented in an apparatus that includes a processor for executing computer executable instructions and memory that stores the computer executable instructions. Each of the above-identified method steps can be implemented as computer readable media storing computer-executable instructions in memory and executed by the processor.

Additional features and advantages of the invention will be apparent upon reviewing the following detailed description.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 4A and 4B illustrate examples of data structures and arrays corresponding to lists of preferred navigation models, in accordance with one or more aspects of the invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

It is noted that various connections are set forth between elements in the following description. It is noted that these connections in general and, unless specified otherwise, may be direct or indirect and that this specification is not intended to be limiting in this respect.

Figure 1:
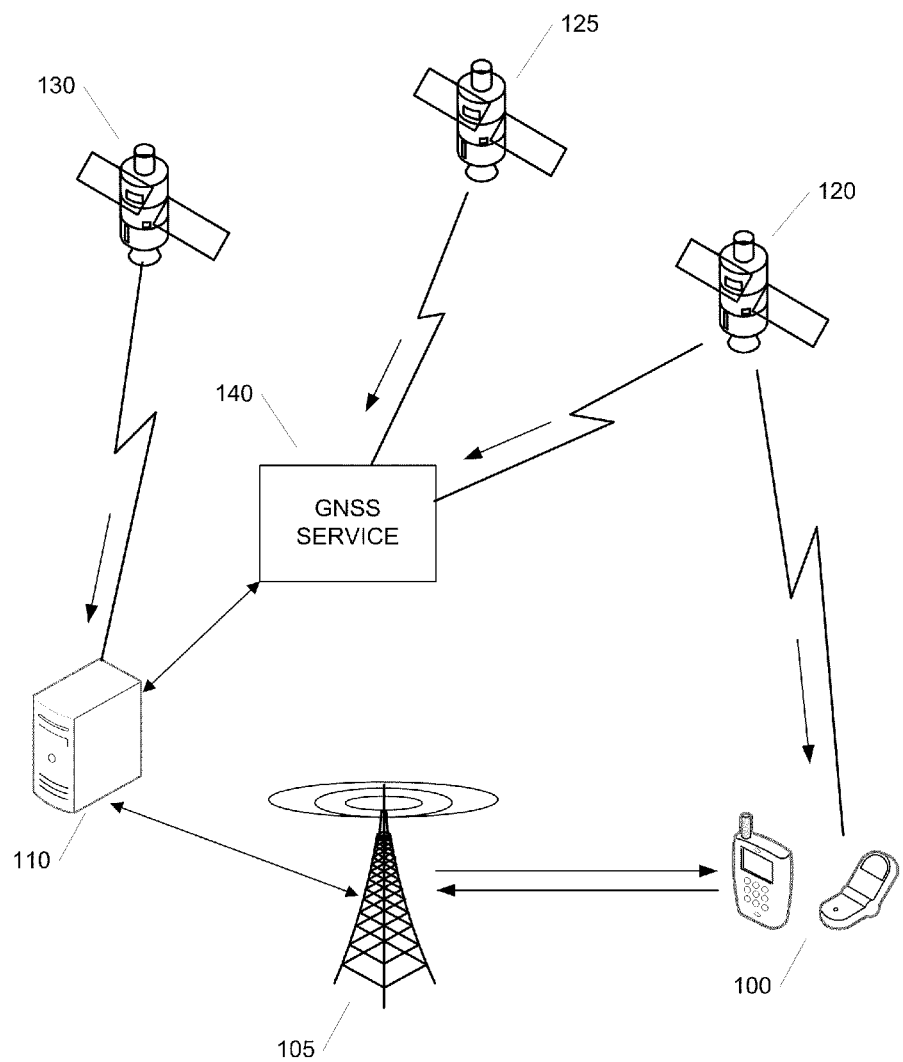
FIG. 1 illustrates an example of a network environment in which one or more illustrative embodiments of the invention may be implemented.

FIG. 1 illustrates a network environment in accordance with one or more embodiments. As shown in this example, a mobile receiver device 100 may receive data signals from one or more satellites 120-130, and may also be in communication with one or more ground-based computing devices via one or more communication networks. In this example, mobile communication device 100 may be a mobile phone, personal digital assistant (PDA), laptop computer, GNSS receiver unit (e.g., a handheld GPS receiver, automobile navigation unit), or any other mobile communications device capable of communication with one or more GNSS satellites 120-130. The mobile receiver 100 is also in communication with an assistance server 110 via a communication network 105, which in this example is a cellular network 105 (e.g., using the radio resource location services protocol (RRLP) for GSM networks and the radio resource control protocol (RRC) as part of the RRC layer of layer 3 in a wideband code division multiple access network (WCDMA)). The Secure User Plane Location (SUPL), standards-based protocol may be employed as a complement or an alternative to the existing standards based on the mobile network control planes and may allow the mobile communication device 100 to communicate with the assistance server 110 such that the mobile communication device 100 may be able to receive assistance data from the assistance server 110.

An assistance server 110 may be any communication device providing assistance data to the mobile receiver 100, that is, any data relating to the position and/or navigation of a GNSS satellite 120-130. For instance, assistance data may include data instructing the mobile receiver 100 where to look for GNSS signals (e.g., Doppler frequency, satellite positions in the sky, etc.), or data providing the mobile receiver 100 with a recent ephemeris for a satellite (e.g., the latest orbit, clock, or almanac parameters), or corrections to an ephemeris, to allow for a more quick and accurate position fix determination of the mobile receiver 100. Assistance server 110 may receive assistance data from one or a plurality of locations. For example, assistance server 110 may receive assistance data from satellites 120-130 within one or more GNSSs (e.g., GPS, GLONASS, Galileo, etc.), and may receive data from one or more GNSS services 140, such as an international GNSS service (IGS) server. Additionally, the assistance server 110 may receive assistance data from other assistance servers and/or other mobile receivers (not shown) via one or more communication networks. Those skilled in the art will appreciate these and other well known techniques for allowing communication and assistance data transfers between mobile receivers 100 and assistance servers 110.

Figure 2:
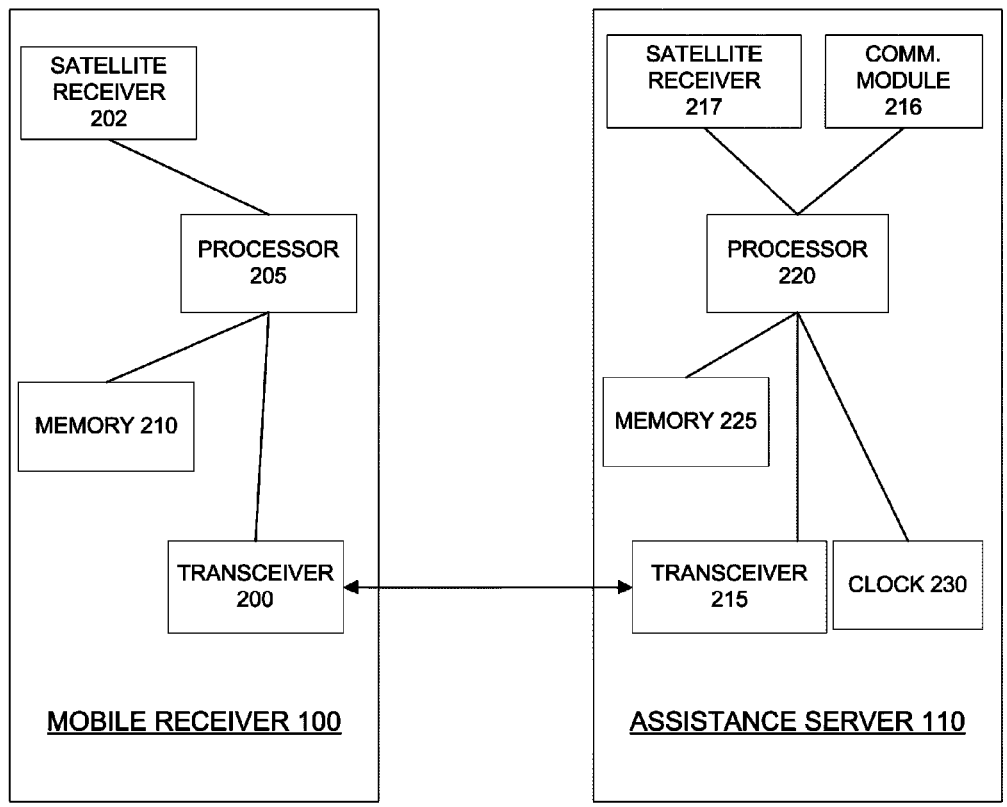
FIG. 2 illustrates a block diagram of an example mobile communication device and an assistance server in accordance with one or more aspects of the invention.

FIG. 2 illustrates a mobile communication device and a computer server in communication in accordance with one or more embodiments. The mobile communication device in this example may comprise a mobile receiver 100 (as shown in FIG. 1), and the computer server in this example may comprise assistance server 110 (as shown in FIG. 1). The mobile receiver 100 may have a transceiver 200 capable of transmitting information to and receiving information from the assistance server 110 (e.g., via one or more cellular networks, IP networks, or other communication networks), as well as a satellite receiver 202 for receiving communications from satellites 120-130 in one or more GNSSs. Mobile receiver 100 may also include a processor 205 and memory 210 for storage and processing of information to be sent or received, such as requests or received assistance data. Additionally, memory 210 of the mobile receiver 100 may store computer-readable instructions for performing any or all of the method steps described herein.

Assistance server 110 may include a transmission device 215 for transmitting and receiving information from the mobile receiver 100 The assistance server 110 may also include one or more additional receivers, for example, a communication module 216 (e.g., an IGS receiver or other receiver configured to receive data from an assistance data service) for receiving satellite data from one or more GNSS services 140, and a satellite receiver 217 for receiving communications from satellites 120-130 in one or more GNSSs. Assistance server 110 may also include a processor 220 and a memory 225, where the memory 225 may store a database for storage of request data among other information. For example, since the assistance server 110 may receive assistance requests from multiple different mobile receivers, a database in memory 225 may store information identifying the mobile receiver 100 corresponding to each request, along with various data related to communication with each mobile receiver 100, such as previously received preference information for the mobile receiver 100, various data types requested and the different parameters requested. Additionally, memory 225 of the assistance server 110 may store computer-readable instructions for performing any or all of the method steps described herein. The assistance server 110 may also include one or more clocks 230 which may be initialized or re-set upon command by, for example, the processor 220. Alternatively, the clocks 230 may be implemented in software under the control of the processor 220.

As mentioned above, computer executable instructions and data used by processors 205 and 220, respectively, and by other components of the mobile receiver 100 and the assistance server 110 may be stored in storage facilities such as memory 210 and 225. Memory 210 of mobile receiver 100, and memory 225 of assistance server 110 may comprise any type or combination of read only memory (ROM) modules or random access memory (RAM) modules, including both volatile and nonvolatile memory such as disks. Software may be stored within memory 210 or 225 to provide instructions to processors 205 or 220 such that when the instructions are executed, the processors 205 or 220 and/or other components of the respective devices 100 and 110 are caused to perform various functions or methods such as those described herein. Software may include both applications and operating system software, and may include code segments, instructions, applets, pre-compiled code, compiled code, computer programs, program modules, engines, program logic, and combinations thereof. Computer executable instructions and data may further be stored on computer readable media including EEPROM, flash memory or other memory technology, CD-ROM, DVD or other optical disk storage, magnetic cassettes, magnetic tape, magnetic storage and the like.

It should be understood that any of the method steps, procedures or functions described herein may be implemented using one or more processors in combination with executable instructions that cause the processors and other components to perform the method steps, procedures or functions. As used herein, the terms "processor" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAS), controllers, application-specific integrated circuits (ASICS), combinations of hardware/firmware, or other special or general-purpose processing circuitry.

Mobile receiver 100 and assistance server 110 or their various components may be configured to transmit, encode, receive, decode and process various types of transmissions including digital broadband broadcast transmissions. Additionally or alternatively, devices 100 and 110 may be configured to receive, decode and process transmissions through an FM/AM Radio transceiver, wireless local area network (WLAN) transceiver, and telecommunications transceiver. Transceivers 200 and 215 may, alternatively, include individual transmitter and receiver components.

Figure 3:
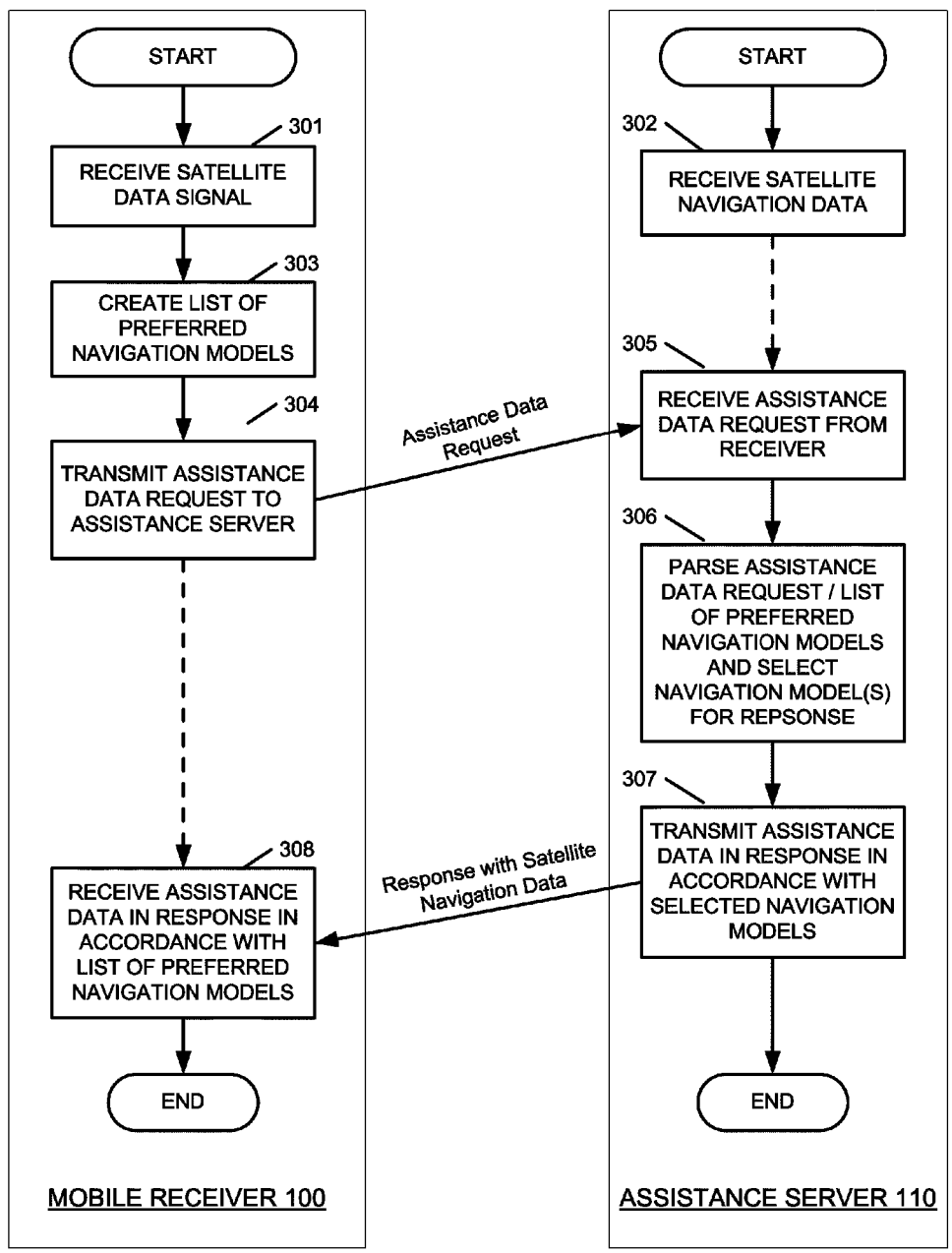
FIG. 3 illustrates a flow diagram of an example process of requesting assistance data by transmitting a list of preferred navigation models and receiving assistance data in response based on the list of preferred navigation models, in accordance with one or more aspects of the invention.

Referring now to FIG. 3, an illustrative process is shown in which a mobile receiver 100 and an assistance server 110 communicate by requesting and receiving assistance data, in accordance with one or more embodiments. In steps 301 and 302, a mobile device (e.g., mobile receiver 100) and a server (e.g., assistance server 110) receive data from one or more satellites in one or more global navigation satellite systems (GNSSs). As discussed below, it should be understood that steps 301 and 302 may be optional in certain embodiments and/or may take place at one or more different times during the course of the communication between the mobile receiver 100 and assistance server 110. For example, the mobile receiver 100 may request assistance data from an assistance server 110 before receiving a signal from a GNSS satellite 120, and may use the received assistance data to determine which GNSS signal(s) are available and to configure the mobile receiver 100 to better receive those signals. In other examples, the assistance server 110 may receive and store GNSS data (e.g., recent ephemeris for GNSS satellites such as orbit, clock, and/or almanac parameters) from satellite signals directly and/or indirectly (e.g., through GNSS server 140 via communication module 216) on a continuous basis while receiving and processing assistance data requests from one or more GNSS receivers.

In step 303, the mobile receiver 100 creates a list of preferred navigation models to be sent to the assistance server 110. As discussed above, a navigation model refers to a format for the parameterization of a type of satellite data. The validity period of a navigation model may typically be a few hours. Almanac refers to an orbit/clock parameterization, but its validity period may be significantly longer, for example, days or weeks. Thus, almanac may be utilized by a GNSS receiver, for example, during start-up to deduce which satellites are visible to the receiver.

To illustrate, satellites in one GNSS may transmit orbital parameters according to a first format, while satellites in another GNSS may transmit orbital parameters in a second format. Additional types of satellite data (e.g., clock parameters, almanac parameters) may have additional different sets of possible formats in different GNSSs. For example, the GPS GNSS, including an L1 C/A signal, may use NAV Keplerian parameters for orbits and $2^{nd}$ degree polynomial for clocks, while the modernized GPS GNSS, including an L1 civil signal, an L2 civil signal, and L5, may use CNAV Keplerian orbit parameters having higher resolution as well as polynomial for clocks with higher precision. Tables 1-3 below provide sample lists of possible parameterizations for orbit data, clock data, and almanac data.

TABLE 1

| Sample Orbit Models |
|---|
| GPS NAV orbit model |
| GPS CNAV orbit model |
| Galileo orbit model |
| GLONASS orbit model |
| Space-Based Augmentation System orbit model |

TABLE 2

| Sample Clock Models |
|---|
| GPS NAV clock model |
| GPS CNAV clock model |
| Galileo clock model (I/F NAV) |
| GLONASS clock model |
| Space-Based Augmentation System clock model |

TABLE 3

Sample Almanac Models

GPS Keplerian
Reduced Keplerian
Midi Keplerian
GLONASS non-immediate information
Space-Based Augmentation System almanac Different receiver terminals may support only a subset of the different types of navigation models. For example, a mobile receiver 100 may have a GPS+GLONASS dual-GNSS receiver, but may be unable to utilize data in the native formats for the Galileo GNSS. A second different mobile receiver might support a different subset of navigation models. Thus, the preferred list of navigation models created by the mobile receiver 100 in step 303 may correspond to the subset of navigation models supported by the receiver 100. Furthermore, since there may be different types of navigation models (e.g., orbit models, clock models, almanac models), it should be understood that the preferred list created by the mobile receiver 100 may comprise multiple different lists for different navigation model types, one combined lists, or other combinations. Different examples preferred list structures of navigation models are discussed below in reference to FIGS. 4A and 4B.

A mobile receiver 100 need not include every supported navigation model in its preferred list. For example, if a receiver 100 supports a large number of navigation models, it may determine that the list will only include a preferred subset of the supported models. Additionally, the list(s) of preferred navigation models created in step 303 may be ordered by the mobile receiver 100 (e.g., in descending order of preference) so that the list may convey a precise order of preference to the assistance server 110. For example, the mobile receiver 100 may support both GPS and GLONASS navigation models, but may prefer to receive satellite data in the native format of the GLONASS GNSS. In this example, the mobile receiver 100 may create lists in which identifiers corresponding the GLONASS clock and orbit models are the first items in the lists, followed by the GPS NAV orbit and clock model, thereby instructing the assistance server 110 to provide GNSS data in accordance with the GLONASS native formats if possible, and otherwise to use the GPS NAV native formats for providing data for GLONASS. Further, the mobile receiver 100 may prefer GPS NAV model for GPS GNSS, in which case the preferred navigation model list for GPS indicates GPS NAV as the first and the single item in the list.

In step 304, the mobile receiver 100 generates and transmits an assistance data request to the assistance server 110, for example, over cellular network 105 or another data communication network. As mentioned above, assistance data may be any data relating to the position characteristics of a GNSS satellite or correction data to the satellite broadcasts. For example, the mobile receiver 100 may request assistance data to facilitate its detection of GNSS satellites, such as satellite trajectories, clock models, frequencies, etc. for available GNSS satellites during a time window. In other examples, the mobile receiver 100 may have already received a GNSS satellite signal, but may request assistance data to confirm the accuracy of satellite data or data to improve accuracy, or to request related data. For instance, a mobile receiver 100 may receive an ephemeris from a GNSS satellite that contains a version identifier but not the complete set of data (e.g., orbit, clock, and/or almanac parameters for the satellite) associated with the ephemeris. In this example, the data assistance request may include the ephemeris identifier, and the assistance server 110 may respond by providing the associated additional ephemeris parameter data from the satellite 120 so that the mobile receiver 100 need not retrieve that data directly from the satellite 120.

In this example, the assistance data request transmitted in step 304 includes the list of preferred navigation models created in step 303. Thus, a mobile receiver 100 may transmit a request for assistance data and a navigation model preference list in a signal request. In other examples, the mobile receiver 100 may transmit the list of preferred navigation models separately from the assistance data request. For instance, a mobile receiver 100 may initially create and transmit its list of preferred navigation models to one or more assistance servers 110, which may store these lists in memory 225 of the assistance server 110 for an extended period of time. Then, for subsequent assistance data requests transmitted by the mobile receiver 100, the assistance server 100 may automatically access and utilize the previously stored list of preferred navigation models for that mobile terminal 100.

In step 305, the assistance server 110 receives the assistance data request from the mobile receiver 110, and in step 306 the assistance server 110 parses the assistance data request to determine the navigation model(s) to utilize in the response. As discussed above, in this example, the assistance data request received from the mobile receiver 100 in step 305 includes a list of preferred navigation models specific to the receiver 100. However, in other examples, the list of preferred navigation models may be sent in a separate transmission, and may also be stored in the memory 225 of the assistance server 110. An assistance server 110 may store preferred navigation model lists for multiple different mobile receivers, and, upon reception of a new assistance data request from a receiver, may retrieve the appropriate list previously stored in memory 225 and parse the list to identify a navigation model for transmission.

As mentioned above, lists of preferred navigation models may be arranged in order of preference by the mobile receiver 100. Thus, if the list is a single flat list (e.g., non-hierarchical) the assistance server 110 may simply traverse the list to identify the first navigation model in the list available at the assistance server 110. For example, the assistance server 110 may determine that the first identifier in a navigation model preference list (i.e., the first preferred model by the mobile receiver 100), corresponds to a navigation model not supported at the assistance server 110, the server 110 may move on to second preferred model and so on, until finding the highest preference model (as ordered by the mobile receiver 100) that is available at the assistance server 110. Of course, the parsing of a preference list may be different in different examples, depending on the list structure and ordering schemes. Two examples of different list structures are shown in FIGS. 4A and 4B, and it should be understood that additional commonly known data structures may be used as well (e.g., dynamically allocated arrays, linked lists, etc.).

Furthermore, as described below in reference to FIGS. 4A and 4B, since a mobile receiver 100 may have a different preferred navigation models for different types (e.g., a preferred orbit model, a preferred clock model, a preferred almanac model), the parsing step of 306 may include identifying multiple navigation models from one or more lists and/or other data structures.

In step 307, the assistance server 110 provides the requested assistance data back to the mobile receiver 100 in accordance with the navigation model(s) selected in step 306. In step 308, the requested assistance data is received at the mobile receiver 100, and may then be used by the mobile receiver 100 in a preferred format to determine current location and navigation information.

FIGS. 4A and 4B show two of the possible examples of lists of preferred navigation models that may be created by a mobile receiver 100 and received/parsed by an assistance server 110. In FIG. 4A, the list structure 400a is comprised of three separate sub-lists corresponding to ordered preferences of navigation models by type. That is, the mobile receiver 100 in this example has created 3 different lists as arrays, an ordered preference list for orbit models 410a, an ordered preference list for clock models 420a, and an ordered preference list for almanac models 430a. In this example, the preference list structure 400a may be created by the mobile receiver 100 as a data structure comprising three fixed-sized arrays (lengths of the arrays has been chosen arbitrarily here to illustrate, how the lists function), as shown in the following code sample:

```
struct AssistanceDataRequest
{
uint8 orbit_model[7];
uint8 clock_model[7];
uint8 almanac[7];
};
```

This structure is repeated for each GNSS for which assistance data is requested. In this example, the different navigation models may be assigned different indices in their respective model types, shown by the following assignments:

```
// Orbit models:
    0x00 - No model requested
    0x01 - GPS NAV orbit model
    0x02 - GPS CNAV orbit model (modernized GPS)
    0x03 - Galileo orbit model
    0x04 - GLONASS orbit model
    0x05 - Space-Based Augmentation System orbit model
// Clock models:
    0x00 - No model requested
    0x01 - GPS NAV clock model
    0x02 - GPS CNAV clock model (modernized GPS)
    0x03 - Galileo clock model (I/F NAV)
    0x04 - GLONASS clock model
    0x05 - Space-Based Augmentation System clock model
// Almanac models:
    0x00 - No model requested
    0x01 - GPS Keplerian
    0x02 - Reduced Keplerian
    0x03 - Midi Keplerian
    0x04 - GLONASS non-immediate information
    0x05 - Space-Based Augmentation System almanac
```

Then, the mobile receiver 100 may populate the list structure 400a with the appropriate preferred navigation models, as shown in the following code sample:

```
AssistanceDataRequest.orbit_model[0]=0x02;
AssistanceDataRequest.orbit_model[1]=0x01;
AssistanceDataRequest.orbit_model[2]=0x04;
AssistanceDataRequest.orbit_model[3...7]=0x00;
...
AssistanceDataRequest.clock_model[0]=0x02;
AssistanceDataRequest.clock_model[1]=0x01;
AssistanceDataRequest.clock_model[2...7]=0x00;
...
AssistanceDataRequest.almanac[0...7]=0x00;
```

Thus, in FIG. 4A, when an assistance server 110 receives a preference list similar to the list structure 400a, it may parse the preference list 400a by identifying and traversing the 3 sub-lists 410a-430a in the list structure 400a in order to determine for each of the different navigation model types, the first preferred navigation model, second preferred navigation model, and so on.

Referring now to FIG. 4B, in this example, a different set of techniques may used for creating and parsing the list structure 400b, which comprises a single combined preference list 410b. In this example, the navigation models may be assigned different identifiers wherein the highest bits of the identifier correspond to the navigation model type, and the lower bits correspond to the navigation model within that type. For example,

```
0x81 - GPS NAV orbit model
0x82 - GPS CNAV orbit model (modernized GPS)
0x83 - Galileo orbit model
0x84 - GLONASS orbit model
0x85 - Space-Based Augmentation System orbit model
0x41 - GPS NAV clock model
0x42 - GPS CNAV clock model (modernized GPS)
0x43 - Galileo clock model (I/F NAV)
0x44 - GLONASS clock model
0x45 - Space-Based Augmentation System clock model
0x21 - GPS Keplerian almanac
0x22 - Reduced Keplerian almanac
0x23 - Midi Keplerian almanac
0x24 - GLONASS non-immediate information
0x25 - Space-Based Augmentation System almanac
```

In this example, the highest bits identify the type of navigation model (i.e., orbit 0x80, clock 0x40, almanac 0x20). Thus, all of the preferred/requested navigation models from different types may be included in the same flat list (e.g., in a single array data structure 410b), which may be created as follows:

```
struct AssistanceDataRequest
{
    uint8 number_of_items;
    uint8 *request;
}
```

After creating the array 410b, the array 410b may then be dynamically allocated to the appropriate size after the mobile receiver 100 determines the number of type of preferred navigation models to be included in the list structure 400b.

AssistanceDataRequest.request=(uint8*)malloc(5*sizeof (uint8))

Finally, before transmitting the preference list 400b the dynamically allocated array 410b may be populated with the preferred/requested navigation models. In this example, the mobile receiver 100 may understand that the assistance server 110 might only consider the relative order of navigation models compared to other navigation models of the same type to determine the preferences of the mobile receiver 100. Thus, the mobile receiver 100 may use any number of different but equivalent ways of populating an array to represent the same relative orders for the navigation models. For example, the following 3 code samples might each populate a different array that may be treated identically by an assistance server 110, because each has the same relative order of navigation models compared to other navigation models of the same type (1)    AssistanceDataRequest.request[0]=0x82;
       AssistanceDataRequest.request[1]=0x81;
       AssistanceDataRequest.request[2]=0x84;
       AssistanceDataRequest.request[3]=0x42;
       AssistanceDataRequest.request[4]=0x41;

```
    (2)     AssistanceDataRequest.request[0]=0x82;
            AssistanceDataRequest.request[1]=0x42;
            AssistanceDataRequest.request[2]=0x81;
            AssistanceDataRequest.request[3]=0x84;
            AssistanceDataRequest.request[4]=0x41;
    (3)     AssistanceDataRequest.request[0]=0x82;
            AssistanceDataRequest.request[1]=0x42;
            AssistanceDataRequest.request[2]=0x41;
            AssistanceDataRequest.request[3]=0x81;
            AssistanceDataRequest.request[4]=0x84;
```

The scheme illustrated in FIG. 4B and using the illustrative code samples above may be used to optimize bandwidth in the assistance data request, since this scheme calls for a single dynamically allocated array. However, other schemes may also be improved and/or optimized with respect to request bandwidth. For example, the scheme illustrated in FIG. 4A may be optimized by dynamically allocating each of the sub-lists 410a-430a to reduce the size of the list structure 400a by eliminating empty/unused array indices.

As discussed above, it should be noted that the assistance server 110 may generate assistance data, for example, orbit parameterizations, using data originating from different sources. The sources may include, for example, GNSS SV broadcasts or GNSS services that generate orbit predictions based on tracking data. For instance, when an assisted GNSS receiver requests orbit data for GPS SV in the GPS NAV parameterization, the data may originate from the true GPS SV broadcast, or may be artificially generated by a service provider.

In certain embodiments, the data source may be of importance for certain functions. For example, if a mobile receiver 100 wishes to utilize correction data broadcasted by a Space-Based Augmentation System. In this example, the correction data may contain corrections to the ranging measurements or to the navigation model data broadcast by the GNSS SVs. Specifically, the correction data broadcast by the SBAS systems might be applicable only with the orbit/clock data originating from the GNSS broadcasts (and might not be applicable for data generated artificially, even though the parameterization might be the same). Therefore, in certain examples it may be important for the mobile receiver 100 to know whether the assistance data it receives originates from the GNSS broadcast or is artificially generated. This information may simply be indicated in the orbit model by a bit field that indicates the source of the data.

Likewise, a mobile receiver 100 may wish to be able to indicate in an assistance data request that it wishes to receive data originating from the GNSS broadcast. In such an example, the data may be bit exact with the GNSS broadcast. Alternatively, the data may be provided in such a way that it allows the mobile receiver 100 to reconstruct a bit exact representation of the (part of) GNSS broadcast.

As an example, when a GPS receiver 100 requests assistance data for GPS SVs in the native GPS NAV format, the receiver might indicate 1) that it prefers GPS NAV format for GPS SVs, and 2) that the receiver prefers that the data content in the GPS NAV models originates from the GPS SV broadcasts and not from artificial sources. This preference may be indicated in the request by, for example, adding a "0x06-Native Model Originating From Broadcast" to the list of applicable orbit model types. In this example, in the case of GPS, the server may interpret 0x06 so that it would return the terminal data for GPS in the GPS NAV orbit format that is bit exact with the GPS SV broadcast.

```
// Orbit models:
    0x00 - No model requested
    0x01 - GPS NAV orbit model
    0x02 - GPS CNAV orbit model (modernized GPS)
    0x03 - Galileo orbit model
    0x04 - GLONASS orbit model
    0x05 - Space-Based Augmentation System orbit model
    0x06 - Native Model Originating From Broadcast
```

In certain embodiments, the above-described techniques for generating, transmitting, parsing, and processing assistance data requests and responses, functionality, steps, and methodology can be implemented as computer-executable instructions stored on computer-readable media. In FIG. 2, processors for executing the computer-executable instructions are shown as 205 and 220. Computer-executable instructions may be implemented as software in memory 210 and 225.

What has been described above is merely illustrative of various aspects and embodiments of the present invention. For example, the present invention is not limited to embodiments in which the assistance data (navigation model types) includes orbit, clock, and/or almanac data. Similar principles and techniques may be utilized, for example, in the case of ionosphere/atmosphere models. In these examples, there may be various parameterizations for the correction data, and the terminal may need to identify which parameterization it can support and which parameterization it prefers to receive. Those skilled in the art can implement other devices, systems, configurations, arrangements, methods, and signal processing techniques without departing from the spirit and scope of the invention. Further, any of the methods of the invention can be implemented in software that can be stored on computer disks or other computer-readable media.

Example Embodiments

The following are example embodiments in accordance with various aspects of the invention.

In at least one example embodiment, it is possible to have the following: A method (e.g., for use at a GNSS receiver) comprising:
    creating a list of preferred navigation models for a mobile receiver
    transmitting an assistance data request comprising said list of preferred navigation models
    receiving a response to said assistance data request, said response comprising assistance data associated with a satellite data signal, wherein said assistance data is formatted in accordance with at least one of the list of preferred navigation models In at least one example embodiment, it is possible to have the following: A method (e.g., for use at a GNSS receiver) comprising:
    receiving a satellite data signal at a mobile receiver
    creating a list of preferred navigation models for the mobile receiver, wherein creating the list comprises:
        identifying a plurality of navigation model types supported at the mobile receiver, wherein the plurality of navigation model types include at least one of:
        Orbit models
        Clock models, and
        Almanac models
        for each of the plurality of navigation model types,
            identifying one or more suitable navigation models for said navigation model type, and
            determining an order for the one or more suitable navigation models for assistance data based on preferences for said navigation model type creating an ordered data structure comprising identifiers for each of the suitable navigation models for each navigation model type, wherein the data structure is ordered based on preferences for each of the navigation model types transmitting an assistance data request comprising said ordered data structure to an assistance server transmitting data identifying said received satellite data signal to the assistance server receiving a response to said assistance data request, said response comprising assistance data associated with the satellite data signal, wherein said assistance data is formatted in accordance with at least one of the list of preferred navigation models In at least one example embodiment, it is possible to have the following: A method (e.g., for use at a GNSS receiver) comprising:

receiving a satellite data signal at a mobile receiver creating a list of preferred navigation models for the mobile receiver, wherein creating the list comprises:

determining a number of navigation model types supported at the mobile receiver creating a data structure comprising the same number of arrays as the determined number of navigation model types for each array corresponding to a navigation model type assigning distinct indices to each of a plurality of navigation models of the navigation model type filling the array with data corresponding to the indices of the navigation models, wherein the array data is ordered based on a preference of the mobile receiver for the navigation model type transmitting an assistance data request to an assistance server, said assistance data request comprising said data structure transmitting data identifying said received satellite data signal to the assistance server receiving a response to said assistance data request, said response comprising assistance data associated with the satellite data signal, wherein said assistance data is formatted in accordance with at least one of the list of preferred navigation models In at least one example embodiment, it is possible to have the following: A method (e.g., for use at a GNSS receiver) comprising:

receiving a satellite data signal at a mobile receiver creating a list of preferred navigation models for the mobile receiver, wherein creating the list comprises:

determining a number of navigation model types supported at the mobile receiver determining a number of suitable navigation models for each of said supported navigation model types dynamically allocating a one dimensional array of sufficient length for each of the suitable navigation models for each navigation model type filling the array with data identifying the suitable navigation models, wherein the array ordered based on navigation model preferences of the mobile receiver transmitting an assistance data request to an assistance server, said assistance data request comprising said data structure transmitting data identifying said received satellite data signal to the assistance server receiving a response to said assistance data request, said response comprising assistance data associated with the satellite data signal, wherein said assistance data is formatted in accordance with at least one of the list of preferred navigation models In at least one example embodiment, it is possible to have the following: A method (e.g., for use at an GNSS assistance server) comprising:

receiving at an assistance server satellite navigation data corresponding to at least one satellite in a GNSS receiving an assistance data request from a receiver identifying from said assistance data request a list of preferred navigation models for the receiver receiving from the receiver an identifier corresponding to a satellite data signal determining that said satellite data signal is one of the plurality of satellite data signals received at the assistance server selecting a navigation model based on the received list of preferred navigation models for the receiver, and based on supported capabilities at the assistance server transmitting a response to said assistance data request, said response comprising assistance data associated with said satellite data signal, wherein said assistance data is formatted in accordance with the selected navigation model In at least one example embodiment, it is possible to have the following: A method (e.g., for use at an GNSS assistance server) comprising:

receiving at an assistance server satellite navigation data corresponding to at least one satellite in a GNSS receiving from a mobile receiver an assistance data request comprising a plurality of lists of preferred navigation models for the mobile receiver receiving from the mobile receiver an identifier corresponding to a satellite data signal selecting a navigation model based on the received plurality of lists of preferred navigation models for the mobile receiver, and based on supported capabilities at the assistance server, said selecting comprising:

determining a navigation model type for a first list in the plurality of lists, wherein the navigation model type is one of:
an orbit model
a clock model, and
an almanac model traversing the first list in order to find a first navigation model of the navigation model type that is supported by the assistance server transmitting a response to said assistance data request, said response comprising assistance data associated with said satellite data signal, wherein said assistance data is formatted in accordance with the first navigation model In at least one example embodiment, it is possible to have the following: A method (e.g., for use at an GNSS assistance server) comprising:

receiving at an assistance server satellite navigation data corresponding to at least one satellite in a GNSS receiving from a mobile receiver an assistance data request comprising a list of preferred navigation models for the mobile receiver receiving from the mobile receiver an identifier corresponding to a satellite data signal selecting a navigation model based on the received list of preferred navigation models for the mobile receiver, and based on supported capabilities at the assistance server, said selecting comprising:

traversing the list in order identifying a first preferred navigation model of a first navigation model type that is supported by the assistance server identifying a second preferred navigation model of a second navigation model type that is supported by the assistance server, wherein the first navigation model type and the second navigation model type each comprise one of:
an orbit model
a clock model, and
an almanac model transmitting a response to said assistance data request, said response comprising assistance data associated with said satellite data signal, wherein said assistance data is formatted in accordance with the first preferred navigation model and the second preferred navigation model In at least one example embodiment, it is possible to have the following: An apparatus (e.g., a GNSS receiving device) comprising:
a processor for executing computer executable instructions;
memory that stores the computer executable instructions;
means for receiving a satellite signal;
wherein the computer executable instructions cause the apparatus to:
create a list of preferred navigation models for the apparatus
transmit an assistance data request comprising said list of preferred navigation models
receive a response to said assistance data request, said response comprising assistance data associated with a satellite signal, wherein said assistance data is formatted in accordance with at least one of the list of preferred navigation models In at least one example embodiment, it is possible to have the following: An apparatus (e.g., a GNSS receiving device) comprising:
a processor for executing computer executable instructions;
memory that stores the computer executable instructions;
means for receiving a satellite signal;
wherein the computer executable instructions cause the apparatus to:
receive a satellite data signal at the apparatus
create a list of preferred navigation models, wherein creating the list comprises:
identifying a plurality of navigation model types supported at the apparatus, wherein the plurality of navigation model types include at least one of:
Orbit models
Clock models, and
Almanac models
for each of the plurality of navigation model types,
identifying one or more suitable navigation models for said navigation model type, and
determining an order for the one or more suitable navigation models for assistance data based on preferences for said navigation model type
creating an ordered data structure comprising identifiers for each of the suitable navigation models for each navigation model type, wherein the data structure is ordered based on preferences for each of the navigation model types
transmit an assistance data request comprising said ordered data structure to an assistance server
transmit data identifying said received satellite data signal to the assistance server
receive a response to said assistance data request, said response comprising assistance data associated with the satellite data signal, wherein said assistance data is formatted in accordance with at least one of the list of preferred navigation models In at least one example embodiment, it is possible to have the following: An apparatus (e.g., a GNSS receiving device) comprising:
a processor for executing computer executable instructions;
memory that stores the computer executable instructions;
means for receiving a satellite signal;
wherein the computer executable instructions cause the apparatus to:
receive a satellite data signal
create a list of preferred navigation models, wherein creating the list comprises:
determining a number of navigation model types supported at the apparatus
creating a data structure comprising the same number of arrays as the determined number of navigation model types
for each array corresponding to a navigation model type
assigning distinct indices to each of a plurality of navigation models of the navigation model type
filling the array with data corresponding to the indices of the navigation models, wherein the array data is ordered based on a preference of the apparatus for the navigation model type
transmit an assistance data request to an assistance server, said assistance data request comprising said data structure
transmit data identifying said received satellite data signal to the assistance server
receive a response to said assistance data request, said response comprising assistance data associated with the satellite data signal, wherein said assistance data is formatted in accordance with at least one of the list of preferred navigation models In at least one example embodiment, it is possible to have the following: An apparatus (e.g., a GNSS receiving device) comprising:
a processor for executing computer executable instructions;
memory that stores the computer executable instructions;
means for receiving a satellite signal;
wherein the computer executable instructions cause the apparatus to:
receive a satellite data signal
create a list of preferred navigation models, wherein creating the list comprises:
determining a number of navigation model types supported at the apparatus
determining a number of suitable navigation models for each of said supported navigation model types
dynamically allocating a one dimensional array of sufficient length for each of the suitable navigation models for each navigation model type
filling the array with data identifying the suitable navigation models, wherein the array ordered based on navigation model preferences of the apparatus
transmit an assistance data request to an assistance server, said assistance data request comprising said data structure transmit data identifying said received satellite data signal to the assistance server receive a response to said assistance data request, said response comprising assistance data associated with the satellite data signal, wherein said assistance data is formatted in accordance with at least one of the list of preferred navigation models In at least one example embodiment, it is possible to have the following: An apparatus (e.g., a GNSS assistance server) comprising:

a processor for executing computer executable instructions;

memory that stores the computer executable instructions;

means for receiving satellite navigation data;

wherein the computer executable instructions cause the apparatus to:

receive satellite navigation data corresponding to at least one satellite in a GNSS receive an assistance data request from a receiver identify from said assistance data request a list of preferred navigation models for the receiver receive from the receiver an identifier corresponding to a satellite data signal determine that said satellite data signal is one of the plurality of satellite data signals received at the apparatus select a navigation model based on the received list of preferred navigation models for the receiver, and based on supported capabilities at the apparatus transmit a response to said assistance data request, said response comprising assistance data associated with said satellite data signal, wherein said assistance data is formatted in accordance with the selected navigation model In at least one example embodiment, it is possible to have the following: An apparatus (e.g., a GNSS assistance server) comprising:

a processor for executing computer executable instructions;

memory that stores the computer executable instructions;

means for receiving satellite navigation data;

wherein the computer executable instructions cause the apparatus to:

receive satellite navigation data corresponding to at least one satellite in a GNSS receive from a mobile receiver an assistance data request comprising a plurality of lists of preferred navigation models for the mobile receiver receive from the mobile receiver an identifier corresponding to a satellite data signal select a navigation model based on the received plurality of lists of preferred navigation models for the mobile receiver, and based on supported capabilities at the apparatus, said selecting comprising:

determining a navigation model type for a first list in the plurality of lists, wherein the navigation model type is one of:

an orbit model a clock model, and an almanac model traversing the first list in order to find a first navigation model of the navigation model type that is supported by the apparatus transmit a response to said assistance data request, said response comprising assistance data associated with said satellite data signal, wherein said assistance data is formatted in accordance with the first navigation model In at least one example embodiment, it is possible to have the following: An apparatus (e.g., a GNSS assistance server) comprising:

a processor for executing computer executable instructions;

memory that stores the computer executable instructions;

means for receiving satellite navigation data;

wherein the computer executable instructions cause the apparatus to:

receive satellite navigation data corresponding to at least one satellite in a GNSS receive from a mobile receiver an assistance data request comprising a list of preferred navigation models for the mobile receiver receive from the mobile receiver an identifier corresponding to a satellite data signal select a navigation model based on the received list of preferred navigation models for the mobile receiver, and based on supported capabilities at the apparatus, said selecting comprising:

traversing the list in order identifying a first preferred navigation model of a first navigation model type that is supported by the assistance server identifying a second preferred navigation model of a second navigation model type that is supported by the apparatus, wherein the first navigation model type and the second navigation model type each comprise one of:

an orbit model a clock model, and an almanac model transmitting a response to said assistance data request, said response comprising assistance data associated with said satellite data signal, wherein said assistance data is formatted in accordance with the first preferred navigation model and the second preferred navigation model In at least one example embodiment, it is possible to have the following: A computer-readable medium that contains computer readable instructions that cause a computer device (e.g., a GNSS receiver) to perform the steps comprising:

creating a list of preferred navigation models for the mobile receiver transmitting an assistance data request comprising said list of preferred navigation models receiving a response to said assistance data request, said response comprising assistance data associated with a satellite data signal, wherein said assistance data is formatted in accordance with at least one of the list of preferred navigation models In at least one example embodiment, it is possible to have the following: A computer-readable medium that contains computer readable instructions that cause a computer device (e.g., a GNSS receiver) to perform the steps comprising:

receiving a satellite data signal at a mobile receiver creating a list of preferred navigation models for the mobile receiver, wherein creating the list comprises:

identifying a plurality of navigation model types supported at the mobile receiver, wherein the plurality of navigation model types include at least one of:

Orbit models

Clock models, and

Almanac models for each of the plurality of navigation model types,
identifying one or more suitable navigation models for said navigation model type, and
determining an order for the one or more suitable navigation models for assistance data based on preferences for said navigation model type
creating an ordered data structure comprising identifiers for each of the suitable navigation models for each navigation model type, wherein the data structure is ordered based on preferences for each of the navigation model types
transmitting an assistance data request comprising said ordered data structure to an assistance server
transmitting data identifying said received satellite data signal to the assistance server
receiving a response to said assistance data request, said response comprising assistance data associated with the satellite data signal, wherein said assistance data is formatted in accordance with at least one of the list of preferred navigation models In at least one example embodiment, it is possible to have the following: A computer-readable medium that contains computer readable instructions that cause a computer device (e.g., a GNSS receiver) to perform the steps comprising:
receiving a satellite data signal at a mobile receiver
creating a list of preferred navigation models for the mobile receiver, wherein creating the list comprises:
determining a number of navigation model types supported at the mobile receiver
creating a data structure comprising the same number of arrays as the determined number of navigation model types
for each array corresponding to a navigation model type
assigning distinct indices to each of a plurality of navigation models of the navigation model type
filling the array with data corresponding to the indices of the navigation models, wherein the array data is ordered based on a preference of the mobile receiver for the navigation model type
transmitting an assistance data request to an assistance server, said assistance data request comprising said data structure
transmitting data identifying said received satellite data signal to the assistance server
receiving a response to said assistance data request, said response comprising assistance data associated with the satellite data signal, wherein said assistance data is formatted in accordance with at least one of the list of preferred navigation models In at least one example embodiment, it is possible to have the following: A computer-readable medium that contains computer readable instructions that cause a computer device (e.g., a GNSS receiver) to perform the steps comprising:
receiving a satellite data signal at a mobile receiver
creating a list of preferred navigation models for the mobile receiver, wherein creating the list comprises:
determining a number of navigation model types supported at the mobile receiver
determining a number of suitable navigation models for each of said supported navigation model types
dynamically allocating a one dimensional array of sufficient length for each of the suitable navigation models for each navigation model type
filling the array with data identifying the suitable navigation models, wherein the array ordered based on navigation model preferences of the mobile receiver
transmitting an assistance data request to an assistance server, said assistance data request comprising said data structure
transmitting data identifying said received satellite data signal to the assistance server
receiving a response to said assistance data request, said response comprising assistance data associated with the satellite data signal, wherein said assistance data is formatted in accordance with at least one of the list of preferred navigation models In at least one example embodiment, it is possible to have the following: A computer-readable medium that contains computer readable instructions that cause a computer device (e.g., a GNSS assistance server) to perform the steps comprising:
receiving a plurality of satellite data at an assistance server
receiving an assistance data request from a mobile receiver
identifying from said assistance data request a list of preferred navigation models for the mobile receiver
receiving from the mobile receiver an identifier corresponding to a satellite data signal
determining that said satellite data signal is one of the plurality of satellite data signals received at the assistance server
selecting a navigation model based on the received list of preferred navigation models for the mobile receiver, and based on supported capabilities at the assistance server
transmitting a response to said assistance data request, said response comprising assistance data associated with said satellite data signal, wherein said assistance data is formatted in accordance with the selected navigation model In at least one example embodiment, it is possible to have the following: A computer-readable medium that contains computer readable instructions that cause a computer device (e.g., a GNSS assistance server) to perform the steps comprising:
receiving a plurality of satellite data signals at an assistance server
receiving from a mobile receiver an assistance data request comprising a plurality of lists of preferred navigation models for the mobile receiver
receiving from the mobile receiver an identifier corresponding to a satellite data signal
selecting a navigation model based on the received plurality of lists of preferred navigation models for the mobile receiver, and based on supported capabilities at the assistance server, said selecting comprising:
determining a navigation model type for a first list in the plurality of lists, wherein the navigation model type is one of:
an orbit model
a clock model, and
an almanac model
traversing the first list in order to find a first navigation model of the navigation model type that is supported by the assistance server
transmitting a response to said assistance data request, said response comprising assistance data associated with said satellite data signal, wherein said assistance data is formatted in accordance with the first navigation model In at least one example embodiment, it is possible to have the following: A computer-readable medium that contains computer readable instructions that cause a computer device (e.g., a GNSS assistance server) to perform the steps comprising:

receiving a plurality of satellite data signals at an assistance server receiving from a mobile receiver an assistance data request comprising a list of preferred navigation models for the mobile receiver receiving from the mobile receiver an identifier corresponding to a satellite data signal selecting a navigation model based on the received list of preferred navigation models for the mobile receiver, and based on supported capabilities at the assistance server, said selecting comprising:
traversing the list in order
identifying a first preferred navigation model of a first navigation model type that is supported by the assistance server
identifying a second preferred navigation model of a second navigation model type that is supported by the assistance server, wherein the first navigation model type and the second navigation model type each comprise one of:
an orbit model
a clock model, and
an almanac model transmitting a response to said assistance data request, said response comprising assistance data associated with said satellite data signal, wherein said assistance data is formatted in accordance with the first preferred navigation model and the second preferred navigation model

What is claimed is:

1. A method comprising:
creating a list of preferred navigation models for a mobile receiver;
transmitting the list of preferred navigation models;
transmitting an assistance data request; and
receiving a response to said assistance data request, said response comprising assistance data associated with a satellite data signal, wherein said assistance data is formatted in accordance with at least one of the list of preferred navigation models;
wherein creating the list of preferred navigation models for the mobile receiver comprises:
identifying a plurality of navigation model types supported at the mobile receiver, wherein the plurality of navigation model types include at least one of:
orbit models,
clock models, and
almanac models;
for each of the plurality of navigation model types,
identifying one or more suitable navigation models for said navigation model type, and
determining an order for the one or more suitable navigation models for assistance data based on preferences for said navigation model type; and
creating an ordered first data structure comprising identifiers for each of the suitable navigation models for each navigation model type, wherein the first data structure is ordered based on preferences for each of the navigation model types.

2. The method according to claim 1, wherein the assistance data request comprises said list of preferred navigation models.

3. The method according to claim 1, wherein creating the list of preferred navigation models for the mobile receiver further comprises:
determining a number of navigation model types to be included in said list of preferred navigation models;

creating a second data structure comprising the same number of arrays as the determined number of navigation model types;
for each array corresponding to a navigation model type:
assigning distinct indices to each of a plurality of navigation models of the navigation model type; and
filling the array with data corresponding to the indices of the navigation models, wherein the array data is ordered based on a preference of the mobile receiver for the navigation model type.

4. The method according to claim 3, wherein the second data structure comprises dynamically allocated arrays.

5. The method according to claim 1, wherein creating the list of preferred navigation models for the mobile receiver comprises:
determining a number of navigation model types to be included in said list of preferred navigation models;
determining a number of suitable navigation models for each of said supported navigation model types;
allocating a one dimensional array of said ordered first data structure of sufficient length for each of the suitable navigation models for each navigation model type;
filling the array with data identifying the suitable navigation models, wherein the array is ordered based on navigation model preferences of the mobile receiver.

6. The method according to claim 1 further comprising transmitting an identifier corresponding to a satellite data signal to an assistance server.

7. The method according to claim 6, wherein said satellite data signal is associated with one of global navigation satellite systems comprising at least the Global Positioning System, the Global Navigation Satellite system and the European Galileo positioning system.

8. The method according to claim 1, wherein the list of preferred navigation models for the mobile receiver is repeated for each global navigation satellite system for which assistance data is requested.

9. A method comprising:
receiving at an assistance server satellite navigation data corresponding to at least one satellite in a global navigation satellite system;
receiving an assistance data request from a receiver;
identifying at least one ordered list of preferred navigation models for the receiver, wherein the list is ordered according to navigation model preference;
receiving from the receiver an identifier corresponding to a satellite data signal;
determining that said satellite data signal is one of a plurality of satellite data signals received at the assistance server;
selecting a navigation model based on the identified ordered list of preferred navigation models for the receiver, and based on supported capabilities at the assistance server; and
transmitting a response to said assistance data request, said response comprising assistance data associated with said satellite data signal, wherein said assistance data is formatted in accordance with the selected navigation model.

10. The method according to claim 9, wherein the at least one list of preferred navigation models for the receiver is identified from said assistance data request.

11. The method according to claim 9, wherein said satellite data signal is associated with one of global navigation satellite systems comprising at least the Global Positioning System, the Global Navigation Satellite system and the European Galileo positioning system.

12. The method according to claim 9, further comprising:
receiving a plurality of lists of preferred navigation models for the receiver;
selecting a navigation model based on the received plurality of lists of preferred navigation models for the mobile receiver, and based on supported capabilities at the assistance server, said selecting comprising:
determining a navigation model type for a first list in the plurality of lists, wherein the navigation model type is one of:
an orbit model,
a clock model, and
an almanac model
traversing the first list in order to find a first navigation model of the determined navigation model type;
wherein said assistance data is formatted in accordance with the first navigation model.

13. The method according to claim 9, wherein said selecting comprises:
traversing the received list of preferred navigation models for the receiver in order;
identifying a first preferred navigation model of a first navigation model type that is supported by the assistance server;
identifying a second preferred navigation model of a second navigation model type that is supported by the assistance server, wherein the first navigation model type and the second navigation model type each comprise one of:
an orbit model,
a clock model, and
an almanac model; and
wherein said assistance data is formatted in accordance with the first preferred navigation model and the second preferred navigation model.

14. An apparatus comprising:
a processor; and
a memory in communication with the processor and having computer executable instructions stored therein;
wherein the computer executable instructions, when executed by the processor, are configured to cause the apparatus to:
create a list of preferred navigation models for the apparatus;
transmit the list of preferred navigation models;
transmit an assistance data request;
receive a response to said assistance data request, said response comprising assistance data associated with a satellite signal, wherein said assistance data is formatted in accordance with at least one of the list of preferred navigation models; wherein creating the list of preferred navigation models for the apparatus comprises:
identifying a plurality of navigation model types supported at the apparatus, wherein the plurality of navigation model types include at least one of:
orbit models,
clock models, and
almanac models,
for each of the plurality of navigation model types,
identifying one or more suitable navigation models for said navigation model type, and
determining an order for the one or more suitable navigation models for assistance data based on preferences for said navigation model type; and
creating an ordered first data structure comprising identifiers for each of the suitable navigation models for each navigation model type, wherein the first data structure is ordered based on preferences for each of the navigation model types.

15. The apparatus according to claim 14, wherein said assistance data request comprises said list of preferred navigation models.

16. The apparatus according to claim 14, wherein creating the list of preferred navigation models for the apparatus comprises:
determining a number of navigation model types to be included to said list of preferred navigation models;
creating a second data structure comprising the same number of arrays as the determined number of navigation model types;
for each array corresponding to a navigation model type:
assigning distinct indices to each of a plurality of navigation models of the navigation model type; and
filling the array with data corresponding to the indices of the navigation models, wherein the array data is ordered based on a preference of the apparatus for the navigation model type.

17. The apparatus according to claim 16, wherein creating the second data structure further comprises dynamically allocating each of the arrays.

18. The apparatus according to claim 14, wherein creating the list of preferred navigation models for the apparatus comprises:
determining a number of navigation model types to be included to said list of preferred navigation models;
determining a number of suitable navigation models for each of said supported navigation model types;
allocating a one dimensional array of said ordered first data structure of sufficient length for each of the suitable navigation models for each navigation model type; and
filling the array with data identifying the suitable navigation models, wherein the array is ordered based on navigation model preferences of the apparatus.

19. The apparatus according to claim 14, wherein the apparatus is a global navigation satellite system receiving device.

20. The apparatus according to claim 14, wherein the apparatus is a mobile communication device.

21. An apparatus comprising:
a processor; and
a memory in communication with the processor and having computer executable instructions stored therein;
wherein the computer executable instructions, when executed by the processor, are configured to cause the apparatus to:
receive satellite navigation data corresponding to at least one satellite in a global navigation satellite system;
receive an assistance data request from a receiver;
identify at least one ordered list of preferred navigation models for the receiver, wherein the list is ordered according to navigation model preference;
receive from the receiver an identifier corresponding to a satellite data signal;
determine that said satellite data signal is one of a plurality of satellite data signals received at the apparatus;
select a navigation model based on the identified ordered list of preferred navigation models for the receiver, and based on supported capabilities at the apparatus; and
transmit a response to said assistance data request, said response comprising assistance data associated with said satellite data signal, wherein said assistance data is formatted in accordance with the selected navigation model.

22. The apparatus according to claim 21, wherein the computer executable instructions further cause the apparatus to:
receive from a mobile receiver a plurality of lists of preferred navigation models for the mobile receiver;
select a navigation model based on the received plurality of lists of preferred navigation models for the mobile receiver, and based on supported capabilities at the apparatus, said selecting comprising:
determining a navigation model type for a first list in the plurality of lists, wherein the navigation model type is one of:
an orbit model,
a clock model, and
an almanac model,
traversing the first list in order to find a first navigation model of the determined navigation model type;
wherein said assistance data is formatted in accordance with the first navigation model.

23. The apparatus according to claim 21, wherein said selecting comprises:
traversing the received list of preferred navigation models for the receiver in order;
identifying a first preferred navigation model of a first navigation model type that is supported by the assistance server;
identifying a second preferred navigation model of a second navigation model type that is supported by the apparatus, wherein the first navigation model type and the second navigation model type each comprise one of:
an orbit model,
a clock model, and
an almanac model; and
wherein said assistance data is formatted in accordance with the first preferred navigation model and the second preferred navigation model.

24. The apparatus according to any of claims 21, wherein the apparatus is a global navigation satellite system assistance server.

25. A computer program product comprising a non-transitory computer-readable storage medium that contains computer readable instructions that are configured to cause a device to perform at least the following:
creating a list of preferred navigation models for a mobile receiver;
transmitting the list of preferred navigation models;
transmitting an assistance data request; and
receiving a response to said assistance data request, said response comprising assistance data associated with a satellite data signal, wherein said assistance data is formatted in accordance with at least one of the list of preferred navigation models;
wherein creating the list comprises:
identifying a plurality of navigation model types supported at the mobile receiver, wherein the plurality of navigation model types include at least one of:
orbit models,
clock models, and
almanac models;
for each of the plurality of navigation model types,
identifying one or more suitable navigation models for said navigation model type, and
determining an order for the one or more suitable navigation models for assistance data based on preferences for said navigation model type; and
creating an ordered first data structure comprising identifiers for each of the suitable navigation models for each navigation model type, wherein the first data structure is ordered based on preferences for each of the navigation model types.

26. The computer program product according to claim 25, wherein creating the list of preferred navigation models for the mobile receiver comprises:
determining a number of navigation model types to be included to said list of preferred navigation models;
creating a second data structure comprising the same number of arrays as the determined number of navigation model types;
for each array corresponding to a navigation model type:
assigning distinct indices to each of a plurality of navigation models of the navigation model type; and
filling the array with data corresponding to the indices of the navigation models, wherein the array data is ordered based on a preference of the mobile receiver for the navigation model type.

27. The computer program product according to claim 25, wherein creating the list of preferred navigation models for the mobile receiver comprises:
determining a number of navigation model types to be included to said list of preferred navigation models;
determining a number of suitable navigation models for each of said supported navigation model types;
allocating a one dimensional array of said ordered first data structure of sufficient length for each of the suitable navigation models for each navigation model type;
filling the array with data identifying the suitable navigation models, wherein the array ordered based on navigation model preferences of the mobile receiver.

28. A computer program product comprising a non-transitory computer-readable storage medium that contains computer readable instructions that cause a device to perform at least the following:
receiving at an assistance server satellite navigation data corresponding to at least one satellite in a global navigation satellite system;
receiving an assistance data request from a receiver;
identifying at least one ordered list of preferred navigation models for the receiver, wherein the list is ordered according to navigation model preference;
receiving from the receiver an identifier corresponding to a satellite data signal;
determining that said satellite data signal is one of a plurality of satellite data signals received at the assistance server;
selecting a navigation model based on the identified ordered list of preferred navigation models for the receiver, and based on supported capabilities at the assistance server; and
transmitting a response to said assistance data request, said response comprising assistance data associated with said satellite data signal, wherein said assistance data is formatted in accordance with the selected navigation model.

29. The computer program product according to claim 28 further comprising,
receiving a plurality of lists of preferred navigation models for the receiver;
selecting a navigation model based on the received plurality of lists of preferred navigation models for the mobile receiver, and based on supported capabilities at the assistance server, said selecting comprising:
determining a navigation model type for a first list in the plurality of lists, wherein the navigation model type is one of:
an orbit model, a clock model, and
an almanac model
traversing the first list in order to find a first navigation model of the determined navigation model type;
wherein said assistance data is formatted in accordance with the first navigation model.

30. The computer program product according to claim 28, wherein said selecting comprises:
traversing the received list of preferred navigation models for the receiver in order;
identifying a first preferred navigation model of a first navigation model type that is supported by the assistance server;
identifying a second preferred navigation model of a second navigation model type that is supported by the assistance server, wherein the first navigation model type and the second navigation model type each comprise one of:
an orbit model,
a clock model, and
an almanac model; and
wherein said assistance data is formatted in accordance with the first preferred navigation model and the second preferred navigation model.

* * * * *